United States Patent
Padmanaban et al.

(10) Patent No.: US 7,573,883 B2
(45) Date of Patent: Aug. 11, 2009

(54) SYSTEM, METHOD AND OPERATOR FOR INCREASING THE ACTIVE WINDOW SIZE IN A NAK-BASED WINDOW PROTOCOL

(75) Inventors: Radhachandran Padmanaban, San Diego, CA (US); Srinivasan Balasubramanian, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 510 days.

(21) Appl. No.: 11/026,958

(22) Filed: Dec. 31, 2004

(65) Prior Publication Data

US 2005/0198028 A1  Sep. 8, 2005

Related U.S. Application Data

(60) Provisional application No. 60/550,630, filed on Mar. 5, 2004.

(51) Int. Cl.
*H04L 12/28* (2006.01)
*H04L 12/56* (2006.01)
*H04W 4/00* (2009.01)
*H04L 12/54* (2006.01)
*G08C 25/02* (2006.01)
*H04L 1/18* (2006.01)

(52) U.S. Cl. .............. 370/394; 370/328; 370/428; 714/748

(58) Field of Classification Search .............. 370/394
See application file for complete search history.

(56) References Cited

U.S. PATENT DOCUMENTS

| | | | | |
|---|---|---|---|---|
| 5,151,689 A | * | 9/1992 | Kabuto et al. | 345/103 |
| 5,151,899 A | * | 9/1992 | Thomas et al. | 370/394 |
| 6,134,246 A | * | 10/2000 | Cai et al. | 370/474 |
| 6,438,105 B1 | * | 8/2002 | Qarni et al. | 370/231 |
| 6,487,689 B1 | * | 11/2002 | Chuah | 714/748 |
| 6,621,796 B1 | * | 9/2003 | Miklos | 370/236 |
| 6,671,288 B1 | * | 12/2003 | Onodera et al. | 370/469 |
| 7,035,214 B1 | * | 4/2006 | Seddigh et al. | 370/231 |
| 2003/0026277 A1 | * | 2/2003 | Pate et al. | 370/412 |
| 2003/0086415 A1 | * | 5/2003 | Bernhard et al. | 370/352 |
| 2004/0042458 A1 | * | 3/2004 | Elzu | 370/394 |

* cited by examiner

*Primary Examiner*—William Trost, IV
*Assistant Examiner*—Andrew Chriss
(74) *Attorney, Agent, or Firm*—Coats & Bennett, P.L.L.C.

(57) ABSTRACT

Peers in a Radio Link Protocol (RLP) communication channel negotiate the size of an inactive window in a receive queue. The window size may be a parameter included in the RLP_BLOB. The receive queue controller may accept the proposed size, or may return a different inactive window size. A sequence number in-range comparison operator, e.g., IN_RANGE (SEQ, LO, HI), is defined that takes a three sequence numbers as input and returns a Boolean indication whether one of the inputs is within the sequence number range delimited by the other two inputs. The comparison is modulo the sequence space. The receiver determines whether a received data frame is within the inactive window by passing the operator the sequence number of the data frame, the L_V(N) pointer less the active window size, and (LV_(N)–1). A negotiated inactive window allows for an active window that exceeds half of the sequence space, which may prevent transmitter queue stalls in high data rate applications.

13 Claims, 3 Drawing Sheets

SYSTEM, METHOD AND OPERATOR FOR INCREASING THE ACTIVE WINDOW SIZE IN A NAK-BASED WINDOW PROTOCOL

RELATED APPLICATIONS

This application claims priority to Provisional U.S. patent application Ser. No. 60/550,630 filed Mar. 5, 2004, which is incorporated herein by reference.

BACKGROUND

The present invention relates generally to the field of wireless communication systems and in particular to a system, method and operator for increasing the active window size in a NAK-based window protocol.

Modern communications systems, including wireless systems, use a layered architecture, with separate protocols for performing defined functions at each layer. The layered protocol approach allows upper level logical operations to be implemented without regard to the lower level physical operations of transmission and reception, error correction and the like.

The IS-2000 CDMA wireless communications standard defines a protocol known as the Radio Link Protocol (RLP) for implementing physical layer communications between a Radio Access Network and a Mobile Station. RLP is unaware of higher layer framing; it operates on a featureless octet stream, delivering the octets in the order received. RLP has procedures to substantially reduce the error rate exhibited by CDMA traffic channels. There is no direct relationship between higher layer packets and the RLP data frames; a large packet may span multiple data frames, or a single RLP data frame may contain all or part of several small higher layer packets.

RLP is a NAK-based window protocol. That is, the receiver does not acknowledge each received data frame. Rather, the receiver receives and processes data frame in order (according to sequence numbers associated with each data frame), sending a Negative AcKnowledgement (NAK) when a data frame is "missed"—either not received or received with unrecoverable errors. The receiver may send a NAK with the sequence number of the missed data frame when one or more data frames are received that are not in contiguous, sequential order to previously received data frames. The NAK is a request to re-transmit the missing data frame. However, the NAK need not be sent immediately. The receiver may continue to receive data frames ahead of the missed frame, hoping to receive the missed frame in an un-requested retransmission. The receiver may also optionally occasionally transmit a "fill" frame, indicating all data frames up to a particular sequence number have been correctly received.

To comply with the NAK protocol, the transmitter must retain a copy of each transmitted data frame in a retransmission queue, against the possibility of receiving a NAK request. Once a NAK is received, the transmitter knows that the receiver has correctly received all data frames previous to the data frame identified in the NAK request. Thus, upon receiving a NAK or fill frame can the transmitter discard copies of previously transmitted data frames, freeing space in its retransmission queue. In some implementations, the transmitter may discard copies of previously transmitted data frames based on a timer waiting a NAK, the rate of buffer built up at the transmitter, or the like. For any fixed size retransmission queue wherein retransmission data frames are retained until a NAK or fill frame, if the receiver properly receives all transmitted data frames, or does not promptly NAK a missing frame, and does not transmit a fill frame, the transmitter may completely fill the retransmission queue with copies of transmitted data frames. Once this occurs the transmitter must stall, and cannot accept new data frames for transmission to the receiver.

The RLP data frame sequence space comprises a 12-bit value, for 4096 sequence numbers. Each data frame is identified by a sequence number, and transmission and reception of data frames is tracked by pointers to queues maintained in the RLP transmitter and receiver. The queues are conceptually configured as circular buffers, and the pointers "wrap around" to continuously utilize the full available queue capacity. Due to the way the queue pointer comparison operators are defined in the RLP, both the transmitter's retransmission queue, and the receiver's active window (into which newly received, non-sequential data frames are stored) are limited to half of the 4096-element sequence space, or 2048 data frames each.

Under high data rates, such as those achievable on packet data channels such as F-PDCH, and good channel conditions generating infrequent NAKs, the receiver's retransmission queue can fill, causing a transmitter queue stall. This typically occurs when a transmission error occurs for a sequence number blocking a pointer in the receiver queue from advancing. In addition, a rigid definition of retransmission queue and active window size may not be optimal for all applications. Applications may benefit from the ability to negotiate the queue and window sizes between RLP peers upon establishing the connection.

SUMMARY

In one aspect, the present invention relates to a method of processing, in a receiver of a communication system, a received data frame having a sequence number, where the receiver has a queue indexed by the sequence numbers. The data frame is processed if the data frame is sequential to previously received sequential data frames. An inactive window is defined in the queue. If the data frame falls within the inactive window, the data frame is discarded. If the data frame is nonsequential to previously received data frames and falls outside the inactive window, the data frame is stored in the queue.

In another aspect, the present invention relates to a comparison operator for managing a circular queue in a communication system. The operator has three numeric inputs and returns a Boolean value indicating whether a target input value is within the numeric range from a low-end input to a high-end input, inclusive. If the high-end input is greater than or equal to the low-end input, then the Boolean value is TRUE if the target input is greater than or equal to the low-end input and the target input is less than or equal to the high-end input. On the other hand, if the low-end input is greater than the high-end input, then the Boolean value is TRUE if the target input is greater than or equal to the low-end input or the target input is less than or equal to the high-end input. If neither case is true, then the Boolean value is FALSE.

In yet another aspect, the present invention relates to a wireless communication system. At least one Base Station transmits a plurality of data frames. At least one Mobile Terminal receives data frames from the Base Station and selectively stores the data frames in a circular receive queue having an inactive window. The Mobile Terminal discards data frames falling within the inactive window. The Base Station transmits to the Mobile Terminal the size of the inactive window prior to transmitting the data frames.

DETAILED DESCRIPTION

Figure 1:
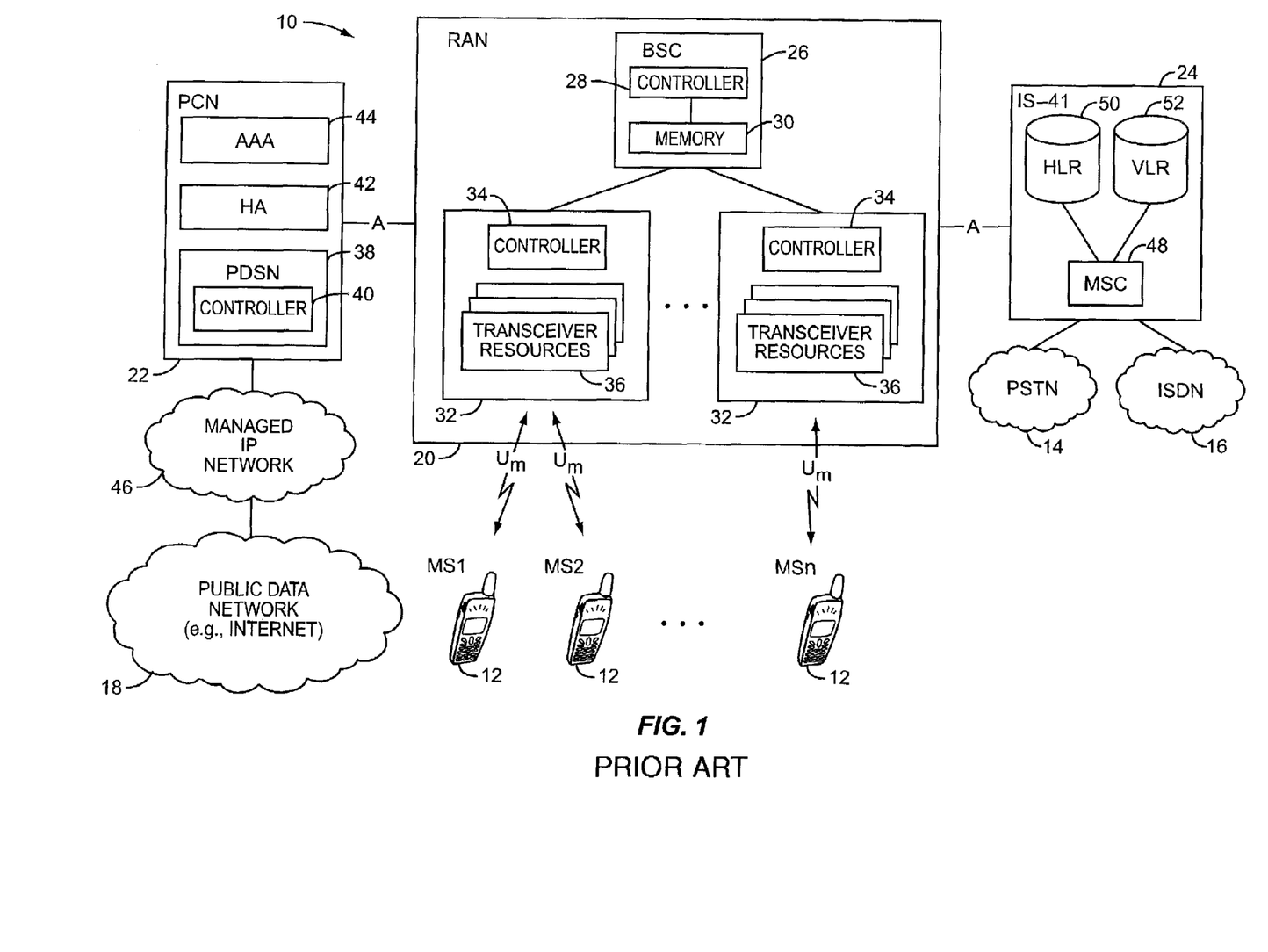
FIG. 1 is a functional block diagram of a wireless communication system.

FIG. 1 illustrates an exemplary wireless communication network generally referred to by the numeral 10. In an exemplary embodiment, network 10 is based on cdma2000, 1×EV-DO/DV standards as promulgated by the Telecommunications Industry Association (TIA), although the present invention is not limited to such implementations. Here, network 10 communicatively couples one or more mobile stations (MSs) 12 to the Public Switched Telephone Network (PSTN) 14, the Integrated Data Services Network (ISDN) 16, and/or a Public Data Network (PDN) 18, such as the Internet. In support of this functionality, the network 10 comprises a Radio Access Network (RAN) 20 connected to a Packet Core Network (PCN) 22 and an IS-41 network 24 across an A interface.

The RAN 20 typically comprises one or more Base Station Controllers (BSCs) 26, each including one or more controllers 28 or other processing systems, with associated memory 30 for storing necessary data and parameters relating to ongoing communications activity. Generally, each BSC 26 is associated with one or more Base Stations (BSs) 32. Each BS 32 comprises one or more controllers 34, or other processing systems, and assorted transceiver resources 36 supporting radio communication with MSs 12, such as modulators/demodulators, baseband processors, radio frequency (RF) power amplifiers, antennas, etc.

BSs 32 may be referred to as Base Transceiver Systems (BTSs) or Radio Base Stations (RBSs). In operation, BSs 32 transmit control and traffic data to MSs 12, and receive control and traffic data from them over the $U_m$ interface. BSC 26 provides coordinated control of the various BSs 32. The BSC 26 also communicatively couples the RAN 20 to the PCN 22.

The PCN 22 comprises a Packet Data Serving Node (PDSN) 38 that includes one or more controllers 40, or other processing systems, a Home Agent (HA) 42, and an Authentication, Authorization, and Accounting (AAA) server 44. Typically, the PCN 22 couples to the PDN 18 through a managed IP network 46, which operates under the control of the network 10. The PDSN 38 operates as a connection point between the RAN 16 and the PDN 18 by establishing, maintaining and terminating Point-to-Point Protocol (PPP) links, and further provides Foreign Agent (FA) functionality for registration and service of network visitors. HA 42 operates in conjunction with PDSN 38 to authenticate Mobile IP registrations and to maintain current location information in support of packet tunneling and other traffic redirection activities. Finally, AAA server 44 provides support for user authentication and authorization, as well as accounting services.

The BSC 26 also communicatively couples the RAN 20 to the IS-41 network 24. The IS-41 network 24 includes a Mobile Switching Center (MSC) 48 accessing a Home Location Register (HLR) 50 and Visitor Location Register (VLR) 52 for subscriber location and profile information. The MSC 48 establishes circuit-switched and packet-switched communications between the RAN 20 and the PSTN 16 and ISDN 16. Those of skill in the art will recognize that the network diagram of FIG. 1 is representative only, and is not limiting. In any given implementation, one or more network nodes may be missing, and additional nodes may be added. In particular, A BSC 26 is not required to implement a wireless network with the functionality of the present invention.

Figure 2:
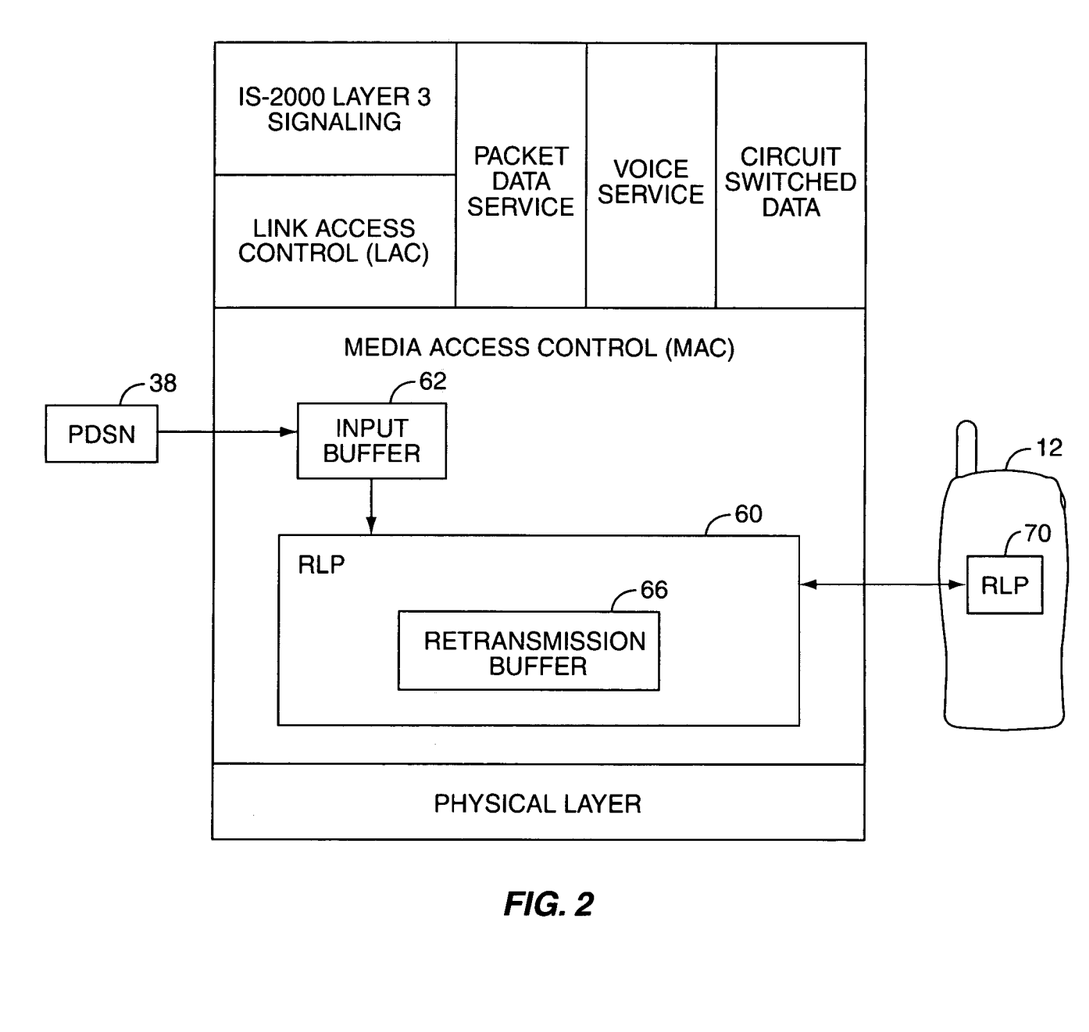
FIG. 2 is protocol layer diagram for the $U_m$ reference point.

The protocol layer structure of the $U_m$ interface—defining communications between the RAN 20 and the MSs 12—is depicted in FIG. 2. At the upper layers, the PCN 22 provides Packet Data Service, and the IS-41 network 24 provides Voice Service and Circuit Switched Data, as described above. The IS-2000 Layer 3, also called the Signaling Layer, comprises base station and mobile station interoperability procedures and associated signaling that allow the end user to receive service.

The Link Access Control (LAC) layer provides transport services over logical channels for Layer 3 signaling. The logical channels may be dedicated or common. Dedicated channels are typically mapped to physical channels assigned to a single user, such as for transmitting voice communications. Common channels are typically mapped to physical channels shared by multiple users, and may carry system overhead traffic, paging messages, and the like. In some cases in modern wireless networks, a dedicated channel such as the Packet Data Channel (PDCH) may be utilized by multiple users. The LAC encapsulates Layer 3 messages into LAC Protocol Data Units (PDU) that are subject to fragmentation and reassembly to make them suitable for transport by the lower layers.

The Media Access Control (MAC) layer maps the logical channels to physical channels and coordinates the use of physical resources. The MAC also enforces the negotiated Quality of Service (QoS) level. The MAC implements a multiplexing and demultiplexing function to allow access to the medium to both PDUs received from the LAC and data units received from user applications. The MAC ensures reliable transmission of data—nearly error-free and in order—through the Radio Link Protocol (RLP) and other protocols. The RLP is a specialized form of selective-repeat Automatic Repeat Request (ARQ) protocol, defined in the IS-707 standard, which is incorporated by reference herein in its entirety. While not explicitly handled by the MAC layer, the RLP is functionally and conceptually part of the MAC layer.

FIG. 2 shows a functional block diagram of an RLP node 60 receiving data frames from the PDSN 38 via a buffer 62. The RLP node 60 communicates data frames to and from a peer RLP node 70, such as one within a mobile station 12. The RLP node 60 maintains a retransmission buffer 66 storing copies of transmitted data frames awaiting acknowledgement from the peer RLP 70, against the possibility of retransmitting the data frames.

The RLP is a negative acknowledgement (NAK)-based ARQ protocol, described above. RLP operation—data transmission and retransmission—proceeds according to parameters that are negotiated when the service is connected (e.g., at call establishment). RLP parameters are contained in a data structure known as the RLP Block of Bits (RLP-BLOB). These parameters include the number of NAKs per round, the number of rounds, and optionally an estimated Round Trip Time (RTT), or the round-trip delay between the Base Station 32 and the Mobile Station 12. For Forward Packet Data Channel (F-PDCH) operation, the RLP-BLOB may additionally include a DELAY_DETECTION_WINDOW (DDW) parameter. The RTT is determined by an initialization SYNC procedure between the BS 32 and the MS 12 at the outset of the service connection.

Figure 3:
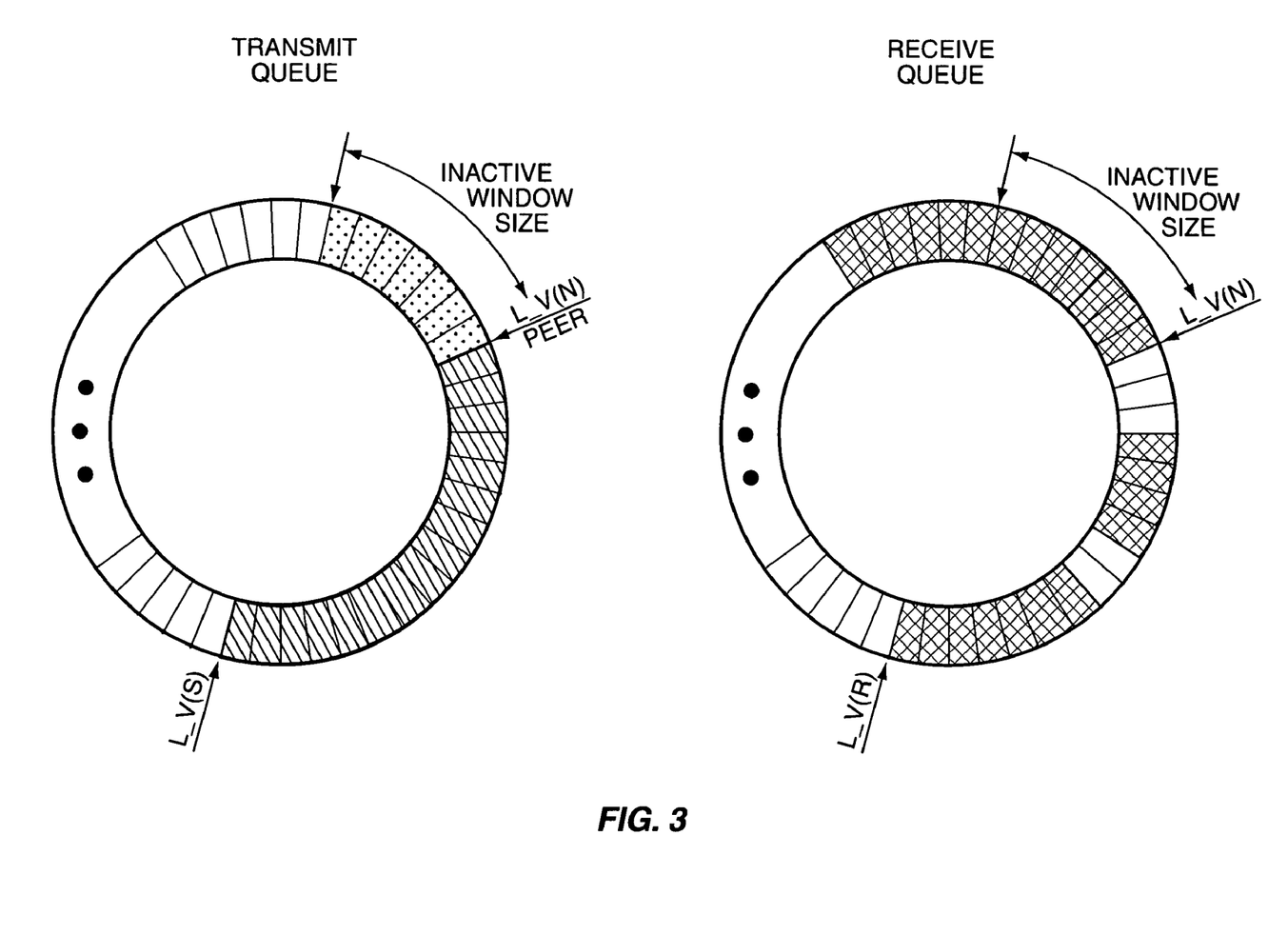
FIG. 3 is a functional diagram of the RLP transmitter and receiver buffers.

Once the RLP parameters are initialized, data transfer may proceed. The RLP data frame sequence space comprises a 12-bit value, for 4096 sequence numbers. Each data frame is identified by a sequence number, and transmission and reception of data frames is tracked by pointers to queues maintained in the RLP transmitter and receiver. The queues are conceptually configured as circular buffers, as depicted in FIG. 3. The four pointers have the following meanings:

L_V(S): 12-bit sequence number of the next data frame to be transmitted.

L_V(R): 12-bit sequence number of the next expected new data frame.

L_V(N): 12-bit sequence number of the next data frame needed for sequential delivery.

L_V(N)$_{PEER}$: An estimate of the peer RPL's L_V(N).

Upon receipt of a new data frame, if the received data frame is the next sequential data frame (by sequence number) to those previously received in sequential order, the receiver stores it in the queue and advances L_V(N). If the new data frame falls between L_V(N) and L_V(R) the data frame is stored in the receiver queue and no pointer is updated. If the new data frame is beyond the most advanced data frame received (by sequence number), the receiver stores it and advances L_V(R) to the sequence number of the received data frame. If a received data frame has a sequence number less than L_V(N), the receiver interprets it as a retransmission of an already properly received, sequential data frame, and discards it. Note that, for a data frame beyond L_V(R) but less than L_V(N), there is an ambiguity as to whether the data frame is an advanced data frame that should be stored, or a previously received data frame that should be discarded. This ambiguity is resolved by dividing the receiver queue into two windows: an active window and an inactive window. As described below, due to the way sequence number comparison operations are defined in the RLP standard, each of the active and inactive windows comprise half the queue, or 2048 data frames. Their boundaries are L_V(N) and (L_V(N)+2048)%4096 (e.g., L_V(N) and 180° around the circular buffer from L_V(N)).

The transmitter advances L_V(S) as it transmits data frames to the receiver. The receiver maintains a pointer L_V(N)$_{PEER}$, which is the transmitter's best estimate of the value of the pointer L_V(N) at the receiver. The data frames between L_V(N)$_{PEER}$ and L_V(S) comprise the retransmission queue. This queue stores copies of previously transmitted data frames, against the possibility of receiving a NAK request to retransmit one or more of the data frames.

Mathematical and logical operations on the sequence numbers are conducted modulo-4096 (i.e., $2^{12}$). In particular, greater-than and less-than operators are defined. The following ranges of sequence numbers are considered to be greater than or less than a data frame sequence number N:

N is greater than the sequence numbers (N−2048)%4096 to (N−1)%4096

N is less than the sequence numbers (N+1)%4096 to (N+2047)%4096

That is, the preceding half of the circular buffer is defined as less than N; the following half of the circular buffer is defined as greater than N. As a pointer advances around the circular transmit or receive queue, so too the opposite point in the circular queue advances, always dividing the circular queue into two halves—less than and greater than the pointer.

Because the receiver will discard any received data frame with a sequence number less than L_V(N), under the preceding definition of the less than operator, the half of the receive circular queue behind L_V(N) is the inactive window. Received data frames whose sequence numbers fall within the inactive window are discarded. The half of the receiver circular queue ahead of L_V(N) is the active window. Received data frames whose sequence numbers fall within the inactive window are stored in the receive queue.

Note that this definition necessarily fixes the transmitter's retransmission queue at the same size: 2048. The transmitter can never advance L_V(S) more than 2048 sequence numbers ahead of L_V(N)$_{PEER}$. Assuming L_V(N)$_{PEER}$ accurately mirrors the receiver's L_V(N), to do so would mean the transmitter would be transmitting data frames that the receiver would consider less than L_V(N) and would discard. As the data frames stored by the transmitter between L_V(N)$_{PEER}$ and L_V(S) comprise the retransmission queue, the retransmission queue is effectively limited to half of the transmit queue size, or 2048 data frames.

Under poor channel conditions that generate a significant number of NAKs, or under fairly low data rates that allow for the relatively frequent sending of fill frames, 2048 may be a sufficient size for the active window and hence the retransmission queue. However, under the high data rates possible on the Packet Data Channels (PDCH), particularly under good channel conditions, the transmitter may experience a queue stall condition, typically when there is a hole in the receiver sequence space due to transmission errors. For example, assuming an average data throughput of 1 Mbps, the 2048-element queue will fill in ≈2048*46*8/1 Mbps=754 msecs.

This number will be even smaller under peak operating conditions of 3 Mbps over F-PDCH. In a queue stall, the transmitter is unable to transmit new data frames to the receiver until the receiver send it an ACK frame, allowing it to advance L_V(N)$_{PEER}$ and discard some of the retransmission copies of previously transmitted data. The queue stall may force the transmitter to discard incoming data frames.

According to the present invention, the transmitter and receiver may negotiate the size of the active window, and hence the retransmission queue. In practice, it is more efficient to do so by negotiating the size of the inactive window. Some inactive window is desired for optimal performance. Under the RLP protocol, the transmitter may retransmit a data frame without receiving a NAK request from the receiver. In this case, the receiver, if it properly received a previous transmission of the data frame, should discard the retransmission. If the previously received data frame was sequential (by sequence number), then L_V(N) advanced past it, placing the received data frame in the inactive window, indicating later-received copies of the data frame should be discarded. Thus, an inactive window provides a convenient mechanism, using existing procedures, to discard superfluous data frames. However, the receive queue need not have an inactive window.

A new RLP parameter INACTIVE_WINDOW_SIZE is defined. The INACTIVE_WINDOW_SIZE is depicted in FIG. 3. This is a 4-bit value specified in units of 256 that defines the inactive window size in the 4096-sequence space. INACTIVE_WINDOW_SIZE may be included in the RLP_BLOB and transmitted from a Base Station 32 to a Mobile Station 12 upon call setup. The MS 12 may then specify a different size by returning a different value for the INACTIVE_WINDOW_SIZE parameter. If the parameter is not included in the RLP_BLOB, the inactive window size is zero. The inactive window extends (INACTIVE_WINDOW_SIZE*256) data frames behind L_V(N). That is, the inactive window spans the range of receive queue from (L_V(N)−((1+INACTIVE_WINDOW_SIZE)*256))%4096 to L_V(N)−1, inclusive. Hence, the active window size spans from L_V(N) to (L_V(N)+(4096−INACTIVE_WINDOW_SIZE*256)%4096. As L_V(N) advances around the circular queue, the inactive window advances just behind it. As discussed above, the size of the retransmission queue in the transmit queue is the same as the size of the active window in the receive queue.

To determine whether a given sequence number falls within the active or inactive window requires a more sophisticated comparison than the RLP-defined "half queue" greater and less than operators. According to the present invention, a new SEQ_IN_RANGE(SEQ, LO, HI) operator is defined to compare if a sequence number SEQ is within the range of the numbers LO and HI, inclusive. In the following definition of the SEQ_IN_RANGE operator the numerical greater than and less than operators are used as they apply to the Natural number space.

If HI>=LO, then SEQ_IN_RANGE(SEQ, LO, HI) is TRUE if SEQ>=LO and SEQ<=HI; otherwise, SEQ_IN_RANGE(SEQ, LO, HI) is FALSE.

If LO>HI, then SEQ_IN_RANGE(SEQ, LO, HI) is TRUE if SEQ>=LO or SEQ<=HI; otherwise, SEQ_IN_RANGE (SEQ, LO, HI) is FALSE.

That is, if the range of the comparison does not cross the wrap-around point of the queue, then the operation's definition is straightforward—the sequence number being compared must be both >= to the lower bound and <= the upper bound to be considered in the range. If the range of comparison does cross the wrap-around point, then the LO parameter (e.g., 4094) is numerically greater than the HI parameter (e.g., 23). In this case, the sequence number being compared is within the range if it is >=the LO parameter or if it is <= the HI parameter (it cannot be both).

The operation of the SEQ_IN_RANGE operator according to one embodiment of the present invention is described by specifying the receiver's action upon receiving a non-retransmitted data frame. The receiver determines the full sequence number L_SEQ from the frame parameters SEQ (an 8-bit version) and SEQ_HI (the upper 4 bits) according to the equation, L_SEQ={SEQ+[SEQ_HI*256]}. The receiver then performs the following actions:

if L_SEQ=L_V(R), then:
  if L_V(R)=L_V(N), then the receiver increments L_V(R) and L_V(N), modulo 4096, and passes the data octets in the data frame to a higher protocol layer.
  If L_V(R)!=L_V(N), then the receiver increments L_V(R), modulo 4096, and stores the data frame in the resequencing queue between L_V(N) and L_V(R).

If L_SEQ satisfies the relation SEQ_IN_RANGE(L_SEQ, (L_V(R)+1)%4096, (L_V(N)−(1+INACTIVE_WINDOW_SIZE)*256)−1)% 4096),—that is, if the data frame is between L_V(R) and the end of the active window—then the receiver stores the data frame in the active window, and advances L_V(R) to (L_SEQ+1)%4096. In this case, the receiver also creates a NAK list entry for each missing data frame with a sequence number between L_V(R) and (L_SEQ−1)%4096, inclusive.

If L_SEQ satisfies the relation SEQ_IN_RANGE(L_SEQ, (L_V(N)−(1+INACTIVE_WINDOW_SIZE)*256))%4096, (L_V(N)−1)%4096)—that is, if the data frame is in the inactive window—the receiver discards the data frame.

If the data frame is a retransmitted frame, then L_SEQ should satisfy the relation SEQ_IN_RANGE(L_SEQ, L_V(N), L_V(R)). In this case, the receiver stores the data frame in the queue, advances L_V(N) to the next missing data frame (or to L_V(R)), passes the data octets in any data frames L_V(N) passed to the higher protocol layer, and removes the received data frame from the NAK list.

In this manner, both the active window in the receiver and the retransmission queue in the transmitter may be set to a size other than half the queues, or 2048. The active window and hence retransmission queue may comprise any size up to the full 4096 sequence numbers. The RLP peers may negotiate the size during call setup via the INACTIVE_WINDOW_SIZE parameter. Particularly in high-data rate applications such as the packet data channels, a larger active window size may prevent frequent transmitter queue stalls.

The flexible window size of the present invention presents numerous advantages over the prior art. The transmit and receive buffers at either end of the RLP link may be negotiated, based on the buffer capabilities of each node. The flexible window sizing can be used for either ACK or NAK based protocols. The same mechanism is applicable to 1×EV-DO as well as 1×EV-DV. Also, the method applied to both packet-based and octet-based sequence numbering.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of processing, in a receiver of a communication system, a data frame received from a transmitter, the received data frame having a sequence number, the receiver having a queue indexed by said sequence numbers, comprising:
   if said data frame is sequential to previously received sequential data frames, processing said data frame;
   defining an inactive window in said queue, said inactive window comprising contiguous queue entries, and wherein the size of said inactive window is negotiated between the receiver and the transmitter;
   if said data frame falls within said inactive window, discarding said data frame; and
   if said data frame is nonsequential to previously received data frames and falls outside said inactive window, storing said data frame in said queue.

2. The method of claim 1 wherein said inactive window moves dynamically through said queue in response to sequentially received data frames.

3. The method of claim 2 wherein said receiver includes a first queue pointer marking the next sequential data frame location in said queue, and wherein said inactive window comprises the negotiated number of queue entries preceding said first pointer.

4. The method of claim 3 wherein the potential size of said queue equals the range of said sequence numbers.

5. The method of claim 4 wherein said queue is configured as a circular buffer, and wherein said first pointer advances through said queue modulo said range.

6. The method of claim 5 wherein whether said data frame falls within said inactive window comprises an in-range operator that determines whether said data frame sequence number falls between said first pointer and said first pointer less the size of said inactive window, modulo said range.

7. The method of claim 6 wherein said receiver includes a second queue pointer marking the next received data frame location in said queue, and wherein whether said nonsequential data frame falls outside said inactive window comprises said in-range operator determining whether said data frame sequence number falls between said second pointer and said first pointer less the size of said inactive window, modulo said range.

8. The method of claim 1 wherein said receiver and transmitter are selected from the group consisting of a Base Station and a Mobile Station.

9. A wireless communication system, comprising
   at least one Base Station transmitting a plurality of data frames; and
   at least one Mobile Station receiving data frames from said Base Station and selectively storing said data frames in a circular receive queue having an inactive window, and discarding data frames falling within said inactive window;
   said Base Station transmitting to said Mobile Station the size of said inactive window prior to transmitting said data frames.

10. The system of claim 9 wherein said Mobile Station, upon receiving a first size of said inactive window from said Base Station, transmits a second, different size for said inactive window to said Base Station, and uses an inactive window of said second size.

11. The system of claim 9 wherein said Base Station retains copies of transmitted data frames in a circular transmit queue, the size of said circular transmit queue being equal to the size of said circular receive queue minus the size of said inactive window.

12. The system of claim 9 wherein said Mobile Station maintains a next-sequential pointer in said circular receive queue at a next expected sequential data frame.

13. The system of claim 9 wherein said Mobile Station determines whether or not a received data frame falls within said inactive window by use of an in-range operator indicating whether a sequence number associated with said data frame falls within the sequence number range from said next-sequential pointer less the size of said inactive window, to one less than said next-sequential pointer.

* * * * *

UNITED STATES PATENT AND TRADEMARK OFFICE
CERTIFICATE OF CORRECTION

PATENT NO.      : 7,573,883 B2
APPLICATION NO. : 11/026958
DATED           : August 11, 2009
INVENTOR(S)     : Padmanaban et al.

It is certified that error appears in the above-identified patent and that said Letters Patent is hereby corrected as shown below:

On the Title Page, item (57), under "ABSTRACT", in Column 2, Line 14, delete "(LV_(N)-l)." and insert -- (L_V(N)-1). --, therefor.

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,573,883 B2 Page 1 of 1
APPLICATION NO. : 11/026958
DATED : August 11, 2009
INVENTOR(S) : Padmanaban et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 968 days.

Signed and Sealed this

Seventh Day of September, 2010

David J. Kappos
*Director of the United States Patent and Trademark Office*